(12) United States Patent
Ellerman et al.

(10) Patent No.: US 8,010,401 B1
(45) Date of Patent: Aug. 30, 2011

(54) METHOD AND SYSTEM FOR MARKET RESEARCH

(75) Inventors: Eloyse M. Ellerman, Lexington, MA (US); George Mount, Palo Alto, CA (US); Sarah Z. Wiley, Provo, UT (US)

(73) Assignee: Intuit Inc., Mountain View, CA (US)

( * ) Notice: Subject to any disclaimer, the term of this patent is extended or adjusted under 35 U.S.C. 154(b) by 1233 days.

(21) Appl. No.: 11/700,288

(22) Filed: Jan. 30, 2007

(51) Int. Cl.
*G06F 9/44* (2006.01)

(52) U.S. Cl. .......... 705/7.29; 705/7.32; 705/54; 705/71

(58) Field of Classification Search .................. None
See application file for complete search history.

(56) References Cited

U.S. PATENT DOCUMENTS

| | | | |
|---|---|---|---|
| 5,673,387 A * | 9/1997 | Chen et al. ........... | 714/38 |
| 6,067,639 A * | 5/2000 | Rodrigues et al. ........ | 714/38 |
| 6,189,029 B1 * | 2/2001 | Fuerst ................ | 709/217 |
| 6,301,701 B1 * | 10/2001 | Walker et al. .......... | 717/125 |
| 6,389,538 B1 * | 5/2002 | Gruse et al. ........... | 713/194 |
| 6,606,581 B1 * | 8/2003 | Nickerson et al. ....... | 702/186 |
| 6,859,784 B1 * | 2/2005 | van Duyne et al. ....... | 705/10 |
| 6,918,113 B2 * | 7/2005 | Patel et al. ........... | 717/178 |
| 7,043,494 B1 * | 5/2006 | Joshi et al. ........... | 1/1 |
| 7,065,677 B1 * | 6/2006 | Hughes ................ | 714/38 |
| 7,085,820 B1 * | 8/2006 | Nickerson et al. ....... | 709/219 |
| 7,370,285 B1 * | 5/2008 | Nickerson et al. ....... | 715/808 |
| 7,472,286 B2 * | 12/2008 | Burkhardt et al. ....... | 713/193 |
| 7,490,319 B2 * | 2/2009 | Blackwell et al. ....... | 717/124 |
| 7,610,578 B1 * | 10/2009 | Taillefer et al. ....... | 717/124 |
| 7,624,264 B2 * | 11/2009 | Aura et al. ........... | 713/162 |
| 7,716,476 B2 * | 5/2010 | Burkhardt et al. ....... | 713/167 |
| 2002/0152110 A1 * | 10/2002 | Stewart et al. ......... | 705/10 |
| 2003/0005413 A1 * | 1/2003 | Beer et al. ............ | 717/125 |
| 2003/0195793 A1 * | 10/2003 | Jain et al. ............ | 705/10 |
| 2004/0049534 A1 * | 3/2004 | Nickerson et al. ...... | 709/203 |
| 2005/0166094 A1 * | 7/2005 | Blackwell et al. ...... | 714/38 |
| 2005/0204201 A1 * | 9/2005 | Meenakshisundaram et al. .................. | 714/38 |
| 2007/0061487 A1 * | 3/2007 | Moore et al. .......... | 709/246 |
| 2008/0126175 A1 * | 5/2008 | Alexander ............. | 705/10 |

OTHER PUBLICATIONS

Declaration of Eloyse Ellerman, Signed Dec. 9, 2008, (4 Pages).

\* cited by examiner

*Primary Examiner* — Romain Jeanty
*Assistant Examiner* — Brett Feeney
(74) *Attorney, Agent, or Firm* — Osha • Liang LLP

(57) ABSTRACT

A method of gathering research associated with a product that includes distributing the product in a market resulting in a distributed product, wherein the distributed product that includes a first test group identified based on a selection key, enabling a first test feature in the first test group, gathering usage data associated with the first test feature from the first test group, and evaluating the first test feature based on the usage data to obtain a test result.

26 Claims, 5 Drawing Sheets

METHOD AND SYSTEM FOR MARKET RESEARCH

BACKGROUND

The development of a product is typically a multi-step process. Initially, the requirements for the product are determined. Specifically, the requirements of the product as specified by the audience (i.e., the end-user of the product) may be identified. For example, if the audience is a single customer, then the customer may inform a company about his/her desires for the product. The company transforms the set of desires into requirements for the product. Using the requirements, the company creates a variety of documents (i.e., documentation) to use during development of the product. Eventually, the product is created based, at least in part, on the documentation.

After the creation of the product, the product is tested. Initially, the product is typically tested by testers employed by the company. For example, employed testers may test a particular software product using a variety of use cases to simulate the use of the software product. After the product achieves the desired results from employee testing, a sample group of users may test the product in a usability lab. While testing the product, users perform a specific, directed task and monitor how easily the task is performed. One of the goals of the usability test is to perform market research on the product. Specifically, the usability test may be used to predict how well a particular audience will use the product. For example, if users experience difficulty using the product, then it may be a failure. Likewise, if users are ecstatic about the product, it may be a smashing success in the market place. At any stage during the testing, the product may be modified and retested before the company releases a final version of the product.

Further, the company may continue to revise and release the product. Specifically, users may detect errors or request modifications of the product. Thus, the company may continuously correct error(s) and attempt to improve the product according to the requests. With each correction and potential improvement of the product, it may be retested using any of the testing techniques described above.

SUMMARY

In general, in one aspect, the invention relates to a method of gathering research associated with a product that includes distributing the product in a market resulting in a distributed product, wherein the distributed product that includes a first test group identified based on a selection key, enabling a first test feature in the first test group, gathering usage data associated with the first test feature from the first test group, and evaluating the first test feature based on the usage data to obtain a test result.

In general, in one aspect, the invention relates to a system for gathering research associated with a product that includes a first test feature in a first test group identified based on a selection key. The system may further include a market research framework configured to distribute the product in a market resulting in a distributed product, wherein the distributed product that includes the first test group, enable the first test feature in the first test group, gather usage data associated with the first test feature from the first test group, and evaluate the first test feature based on the usage data to obtain a test result.

In general, in one aspect, the invention relates to a computer usable medium that includes computer readable program code embodied therein for causing a computer system to monitor distribution of the product in a market resulting in a distributed product, wherein the distributed product that includes a test group identified based on a selection key, enable a first test feature in the test group, gather usage data associated with the first test feature from the test group, and evaluate the first test feature based on the usage data to obtain a test result Other aspects of the invention will be apparent from the following description and the appended claims.

DETAILED DESCRIPTION

Figure 1:
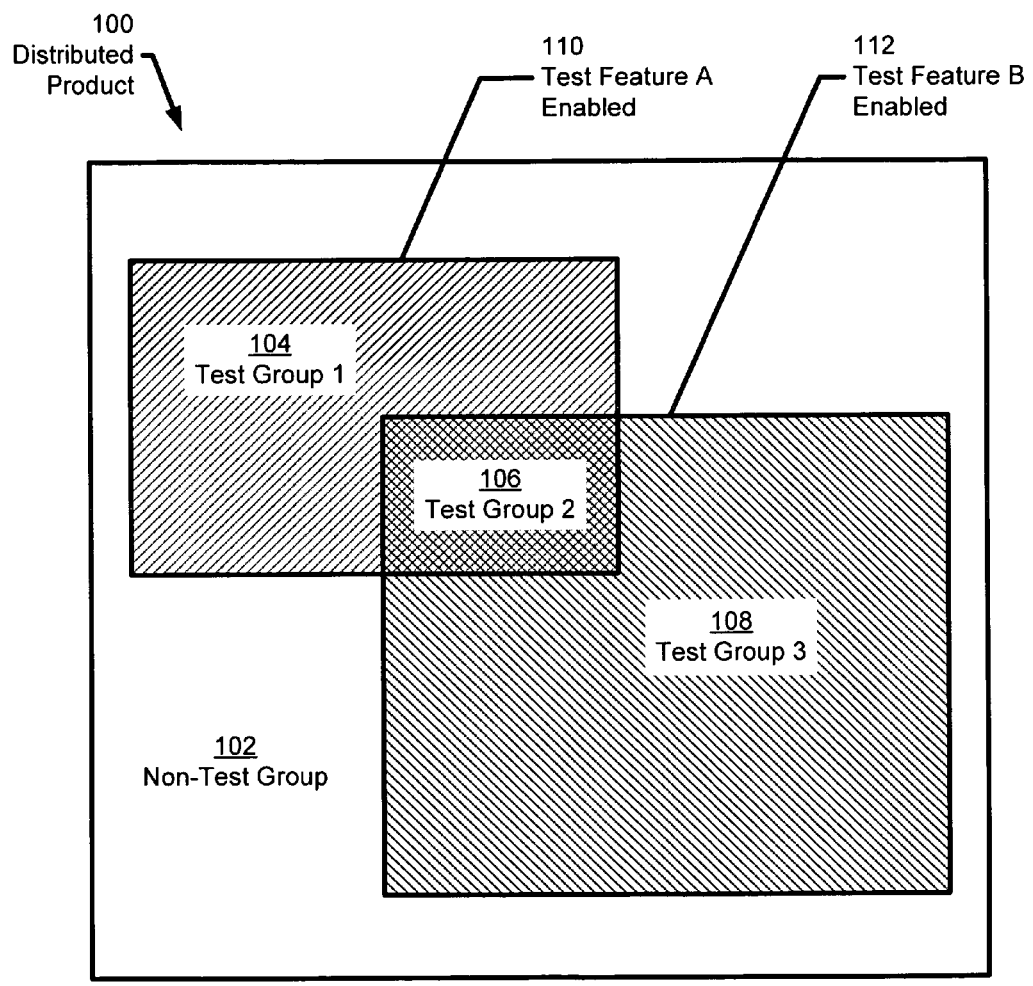
FIG. 1 shows an example distribution diagram for gathering research in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for gathering research associated with one or more features of a product in the marketplace. Specifically, embodiments of the invention provide a method and system for performing market research testing of an identified test feature of a distributed product.

In one or more embodiments of the invention, a feature corresponds to a specific portion of a product. For example, a feature may correspond to a menu, an option in a menu, a storage technique, etc. Further, a feature may or may not be visible to the user of the product. For example, a feature may correspond to a button in a user interface in addition to the actions performed when the button is selected. A feature of a product may be a standard feature or a test feature. A test feature is a feature being tested in a product distributed to the marketplace. A standard feature is a feature that available for all users of the product distributed in the marketplace. Embodiments of the invention provide a mechanism to enable a test feature on a test group of a distributed product for the purposes of testing the feature in the marketplace, or to disable or modify a standard feature.

FIG. 1 shows a distribution diagram for gathering research data in accordance with one or more embodiments of the invention. A product, when distributed in the market, becomes a distributed product (100). In one or more embodiments of the invention, a distributed product may include one or more of the following examples. In one example, a distributed product may correspond to software. Software may be distributed as an executable to be stored locally by a user's computer and/or as a web services product. If the distributed product is a web services product, then copies of the distributed product may correspond to data that is transmitted between a server and user's computer using the web services distributed product. For example, a specific user's account in a web-based email application may be a copy of a distributed product. In a different example, a copy of a distributed product may be executing on multiple computers under a single license. Alternatively, a distributed product may be hardware, such as a type of computer or embedded device. For example, a distributed product may correspond to a server farm. The server farm may be designed for each customer with only a few features that are similar between each customer's copy of the server farm.

A distributed product may span a single style, version, and/or edition. Likewise, the a distributed product may include multiple styles, versions, and/or editions, such as standard, basic, advanced, premier, gold, silver, version 6.0, version 6.5, professional editions, home edition, etc. In one or more embodiments of the invention, a distributed product may be distributed as copies of the product. Each copy of the distributed product may be configured and/or designed for a specific user, group, etc.

Continuing with FIG. 1, a distributed product may be partitioned into a non-test group (102) and one or more test groups (e.g., test group 1 (104), test group 2 (104), test group 3 (108)). The non-test group (102) may include members (i.e., one or more copies of the distributed product), which are not designated to be tested.

In contrast to non-test group (102), test groups (e.g., test group 1 (104), test group 2 (104), test group 3 (108)) include members (i.e., one or more copies of the distributed product), which have test features available. Specifically, members of a test group may use the test feature when the test feature is available and enabled. Each member of a single test group has the same test features available, in accordance with one or more embodiments of the invention.

As shown in FIG. 1, test group 1 (104) corresponds to partition of the distributed product (100) that only has test feature A enabled (110). Similarly, test group 3 (108) may be a partition of the distributed product (100) that only has test feature B enabled (112). Test group 2 (106) corresponds to group of the distributed product (100) that has test feature A enabled (110) and test feature B enabled (110). By enabling multiple test features for a particular test group, an in-market researcher may be able to identify how the market may interact with an individual feature and how the market may interact with a collection of features.

Figure 2:
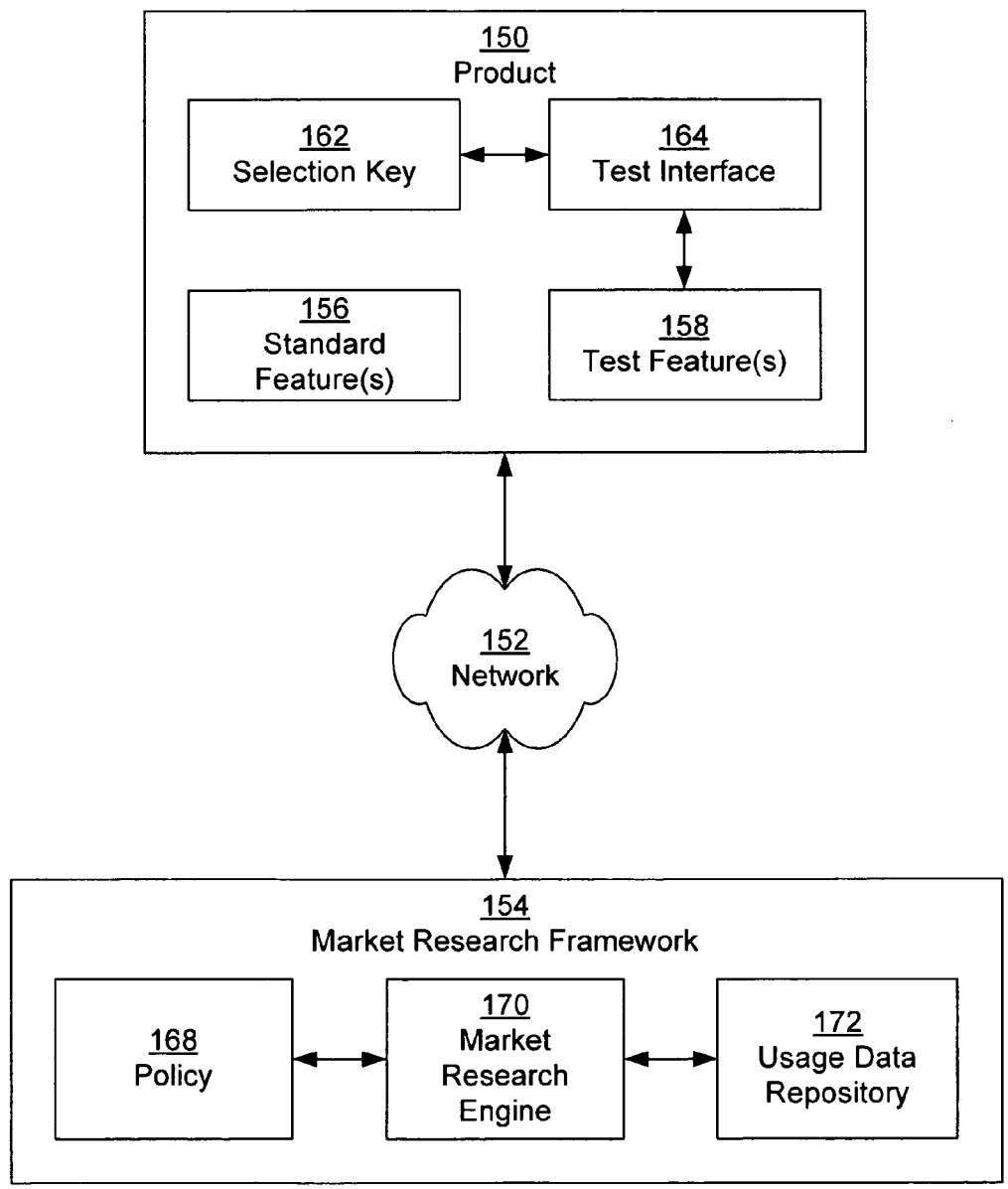
FIG. 2 shows a schematic diagram of a system in accordance with one or more embodiments of the invention.

FIG. 2 shows a schematic diagram of a system in accordance with one or more embodiments of the invention. As shown in FIG. 2, the system includes a product (150), a network (152), and a market research framework (154). Each of these components is described below.

As discussed above, a product (150) corresponds to any type of software that is distributed in the market in accordance with one or more embodiments of the invention. A product (150) may include standard feature(s) (156), a test feature(s) (158), a selection key (162), and/or a test interface (164) in accordance with one or more embodiments of the invention. Standard feature(s) (156) correspond to the features not being tested. For example, standard product features (156) may be the portions of a product that were in a previous release and/or have been incorporated for all product instances in the current release. A test feature (158) corresponds to a feature that is being tested in the market (150). A test feature (158) may be, for example, a newly designed feature that is being tested for operability and market acceptance or a previously standard feature that is being tested to determine whether modifications or removal is appropriate. The test feature (158) may be embedded in the code of the distributed product when the product is distributed or as an update after the product is distributed.

Continuing with FIG. 2, a product also includes a selection key (162), which corresponds to an alphanumeric key used to identify the product as a member of a particular test group or non-test group. The selection key (162) may be a value obtained by performing a hash function on an identifier of a copy of a product. For example, the identifier may correspond to a license key (e.g., an alphanumeric number) for the product, a unique identifier of a customer of the product concatenated with a computer identifier, etc. Alternatively, the selection key (162) may be a randomly generated value. In one or more embodiments of the invention, the selection key (162) has a numeric integer value between zero and ninety-nine.

In addition to the selection key (162), the product (150) may also include a test interface (164), in accordance with one or more embodiments of the invention. The test interface (164) corresponds to an interface, e.g., graphical user interface, application programming interface, etc., for accessing information about members of a test group (or non-test group) for testing purposes remotely. For example, the test interface (164) may includes an interface to select a copy of the product (150) to join a test group, identify the test group, identify the test feature that are available and enabled, identify only the enabled or only the disabled test features, disable or enable test feature(s) (158), identify the selection key (152), and/or obtain usage data from the product instance (150). Further, the test interface (164) may also include an interface to debug a test feature when the product is distributed in the market.

Additionally, the test interface (164) may include a security mechanism (not shown). The security mechanism includes functionality to prevent unauthorized access to a user's data. Specifically, the security mechanism ensures that the obtained usage data does not include privileged user data.

In one or more embodiments of the invention, the product instance (150) may be connected, continuously or sporadically, to a network (152). The network (152) may be virtually any type of network, such as a wide area network (e.g., the Internet), a local area network, or any other type of network or combination thereof.

In addition to the product (150), the network (152) is also connected to a market research framework (154) in accordance with one or more embodiments of the invention. The market research framework (154) includes functionality to perform and monitor market research. Further, the market research framework (154) includes a policy (168), a market research engine (170), and a usage data repository (172). Each of the components of a market research framework is described below.

A policy (168) corresponds to a collection of requirements for market research. The policy (168) may specify a collection of one or more test features available for members of a test group, the size of the test group, or attributes of the members of the test group (e.g., customer under the age of twenty-five, a geographical location, version(s) of the product, etc.). In addition, the policy (168) may specify whether to permanently enable or disable the test features after the market test is performed, the duration of the market test, name of the market test, or other such requirements. By allowing a policy to be configured, one or more embodiments of the invention provide a mechanism whereby a researcher may modify the market test (as necessary) by changing the test features, compare the use of the product with the use of the product by a control group, and analyze the results of the market test in a realistic environment. For example, by setting a longer duration of the market test, a market researcher may determine how the usage of the test feature changes as a user naturally learns how to use the test feature and the product. In one or more embodiments of the invention, the policy (168) is specified using a language, such as an extensible markup language file.

Rather than the policy specify requirement for market research on a test group basis, the policy may specify requirement for market research on the basis of a feature. Specifically, the policy may specify that the duration for a test feature, a percentage of product instances to use the test feature by itself, a size of the population to have the test feature in which the population spans multiple test groups, and a size of a non-test group.

The market research framework (154) may include a usage data repository (172). A usage data repository (172) corresponds to a storage unit (e.g., file system, database, etc.) for usage data. Usage data corresponds to any type of data generated using a product (150). For example, usage data may be whether the test feature is used, the number of times the test feature is used, the number of times an alternative to the test feature is used, amount of sales of the product, amount of sales generated for auxiliary product that can be attributed to a test features on the product, feedback from a user regarding a test feature, etc. The numbers stored in the usage data repository (172) may be maintained as event logs, simple counts, a ratio, percentage, scaled number, or any other format for storing such information.

The usage data repository (172) and the policy (168) may be accessible by a market research engine (170) in accordance with one or more embodiments of the invention. The market research engine (170) may include functionality to parse a file that includes the policy, identify one or more selection keys to select members of the test group, and enable the test feature set on the members of the test group according to whether the copy of the product has the identified selection key. The market research engine may also include functionality to access the test interface (164), remotely enable/disable test feature(s) and test feature sets, obtain usage data, debug a test feature, monitor the duration of the test, and populate a usage data repository (172).

Further, the market research engine (170) may include functionality to evaluate (e.g., perform a statistical analysis on) the usage data and determine whether to maintain the test feature, modify the test feature, etc. The market research engine (170) may be distributed into multiple components, such as one or more software components, hardware components, and/or human components. Specifically, each function performed by the market research engine may be performed by a different component of the market research engine. For example, one component of the market research engine (170) may include functionality to present the usage data, such as in charts, graphs, aggregated data, etc. Another component of the market research engine (170) may include functionality to evaluate the usage data and determine whether and how to incorporate the test feature into the product.

Figure 3:
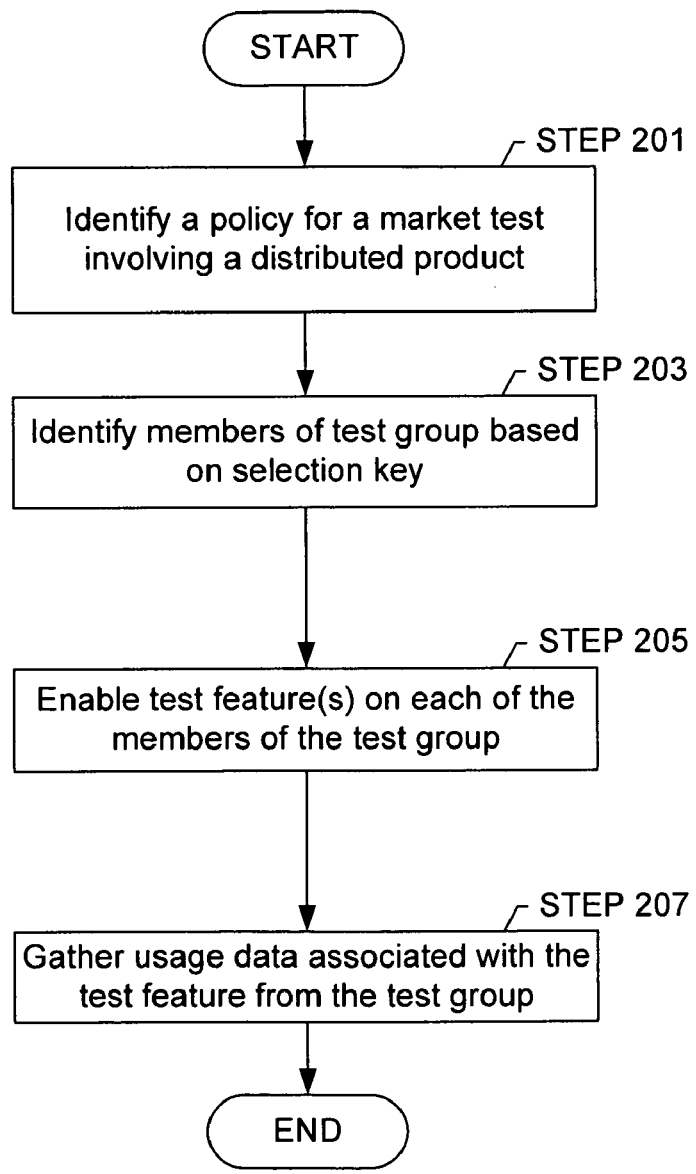
FIGS. 3-4 show a flowchart of a method in accordance with one or more embodiments of the invention.
Figure 4:
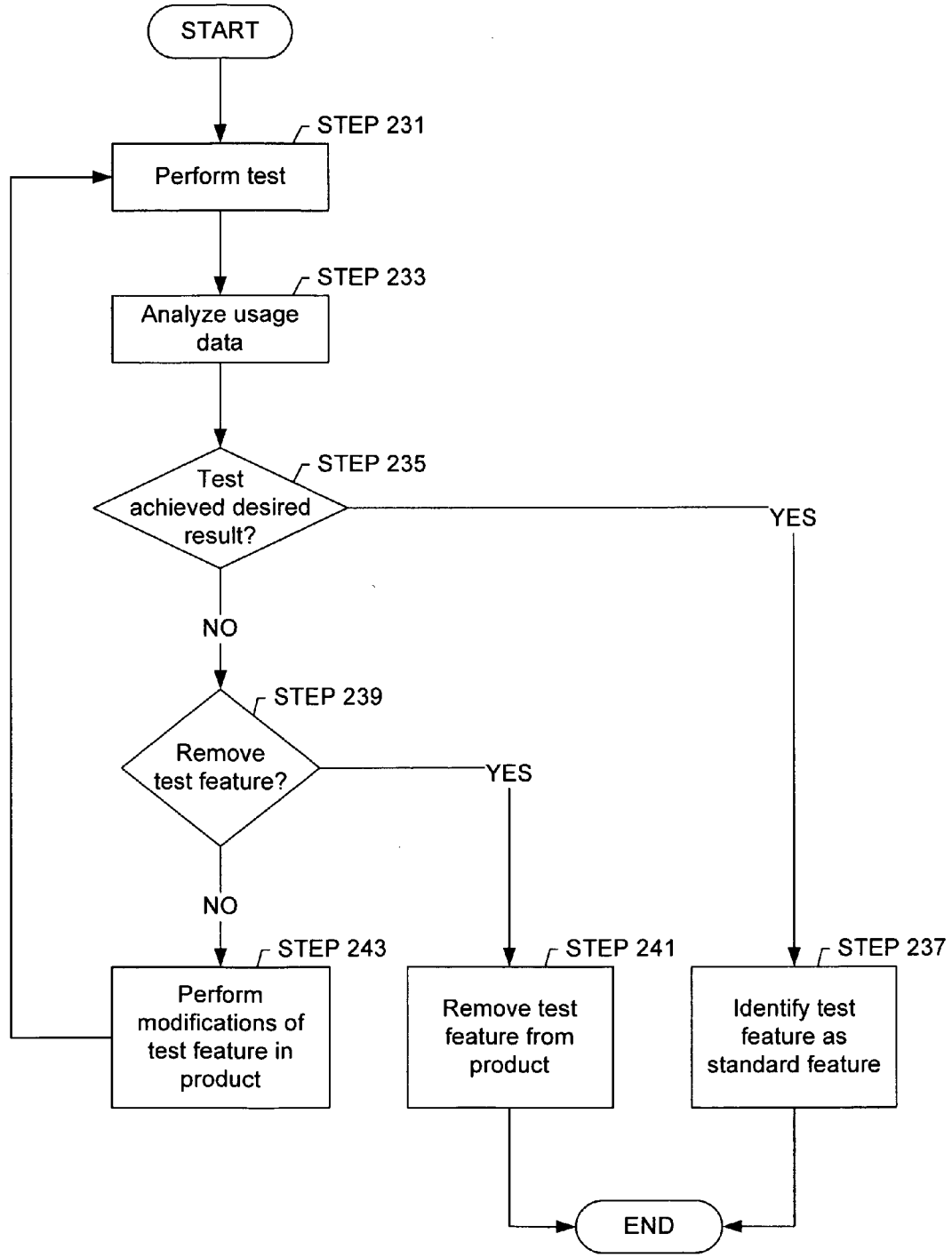

FIGS. 3-4 show a flowchart of a method in accordance with one or more embodiments of the invention. FIG. 3 shows a flowchart of a method for managing market research in accordance with one or more embodiments of the invention. Initially, a policy for a market test is identified (Step 201). Identifying the policy may be performed by a market research and/or a computer. Identifying a policy may include both generating the policy and parsing the policy. For example, a researcher or policy developer may generate a policy using a template, a form that has default values, a software program, etc. Specifically, the market researcher or policy developer may determine which test features to include for the test group.

The test features may be specified according to predefined rules, which are defined by a company performing the test. For example, a rule may state that each feature must be tested on five percent of the product instances by itself, on five percent of the product instances with one or more other test features, etc. In another example, a rule may specify a minimum duration for testing a feature set.

Alternatively, a computer system may generate the policy according to the predefined rules. Regardless of how the policy is generated, a computer system may parse the policy. Parsing the policy may include reading the policy to determine the requirements for the market research.

Based on the policy, the members of the test group are identified by selection key (Step 203). At this stage, a determination is made as to the size of the test group according to the policy. Based on the size, a collection of the selection keys is chosen.

For example, consider the scenario in which the selection keys represent numbers between zero and ninety nine. Further, test groups have been previously created that use eight percent of the copies of the product distributed in the market. In the example, a new policy specifies that a market test should be performed on twelve percent of the copies of the product distributed in the market. Then, in the example, copies of the product having selection keys corresponding to numbers between zero to seven, inclusive, may be designated as members of a previously created test groups. Selection keys corresponding to numbers between eight and nineteen, inclusive, may be chosen for the next market research. Accordingly, the members of the new test group may only have selection keys between eight and nineteen, inclusive.

Alternatively, the registration of product may dictate membership into a test group. For example, selection key "A" may be assigned to each tenth registered copy of a product, selection key "B" may be assigned to each tenth registered copy of a product after selection key "A", and so forth for ten distinct selection keys. In the example, a policy may specify the size of the test group in ten percent increments. When identifying members of the test group, one or more selection keys, such as "A", "B", etc. may be chosen that are not previously used by another test group based on the policy.

Continuing with FIG. 3, after identifying members of the test group, the test feature(s) are enabled for each member of the test group (Step 205). A variety of techniques may be used to enable test feature(s). One technique may involve only making the test feature(s) available in the members of the test group when distributing the product. Non-test groups may not have the test features available.

In another technique, the test feature(s) may be enabled by accessing the test interface on each member of the test group. Specifically, a command may be sent to the test interface to grant permission to enable one or more test features. Next, the test features may be enabled, together (or separately), at virtually any time during the lifetime of the member.

Yet another technique may involve sending an update to the product instance that contains the test feature(s). In such scenario, when the update is installed, the test features may be enabled for the product. While not explicitly discussed, alternative techniques may also be used to enable one or more test feature(s).

During the market research, usage data associated with the test feature is gathered from the test group (Step 207). Specifically, the members of the test group may collect the usage data and transmit the usage data to the market research framework as shown in described in association with FIG. 2. The usage data may be collected while the product instance is in use, periodically or sporadically, or at the end of the use. For example, a product that is only used for a specific tax season may have usage data collected during the tax season. At the end of the tax season, members of the test group may transmit usage data to the market research framework to determine whether to include the test features in a version of the product designed for the next tax season. Collecting the usage data may be performed for example, by the feature analysis framework querying the test interface for usage data.

Alternatively, some feature tests may be performed without the test interface on the product instance. For example, consider the scenario in which the usage data corresponds to the number of times a test feature is used to access a website. In such scenario, the number of times that the website is accessed from the member using the test feature may be identified by code on the website. Accordingly, a test interface may not be required.

In one or more embodiments of the invention, usage data is gathered until the duration of the market test expired. The duration of the market test may be specified by the policy or according to a command. For example, if the test feature has errors in the code of the test feature, then a command may be sent to the members of the test group to end the market test. After the market test of a test feature, the test feature(s) may be permanently enabled or disabled. By permanently enabling and/or disabling test features, the market research may be transparent to the user.

During or after performing the market research, the market research may be evaluated. FIG. 4 shows a flowchart of a method to evaluate market research in accordance with one or more embodiments of the invention. Initially, the test is performed (Step 231). The test may be performed as described above and in FIG. 3. Further, usage data is analyzed (Step 233). Specifically, the usage data may be aggregated to identify how the test feature is used, feedback may be concatenated and read, etc.

Based on the usage data, a determination is made whether the test feature achieved the desired result (Step 235). Specifically, a determination is made from the usage data whether the test feature performs properly in the market place. For example, if feedback from the test feature was positive, then the test feature may be deemed as achieving the desired result.

If the test feature has achieved the desired result, then the test feature is identified as a standard feature (Step 237) in accordance with one or more embodiments of the invention. For example, the test feature may be incorporated as a standard feature in the next release of the product. Further, in accordance with one or more embodiments of the invention, the test feature may be enabled for all current distributed copies of the product.

Alternatively, if the test feature did not achieve the desired result, then a determination is made whether to remove the test feature (Step 233). For example, if the test feature is performing poorly or if the feedback is negative for the test feature, then removing the test feature may be desired. In such scenario, the test feature is removed from the product (Step 241). The test feature may be removed from the distributed product and/or may not be included in a future release of the product.

Rather than removing the test feature, a determination may be made to test a modified version of the test feature. For example, feedback may indicate that the test feature would be better received if the test feature is performed in a different manner. In another example, based on the usage data, a market researcher may theorize that the test feature would be better utilized if the interface where modified. If the test feature is to be modified, then modification on the test feature in the product is performed (Step 243). Typically, the modification is performed by the developer(s) of the test feature, however anyone capable of performing the modification may do so.

Modifying the test feature may result in the desire to retest the modified test feature. In such scenario, another test is performed (Step 231). The test feature may be modified on the distributed product, copies of the product not yet distributed, and/or on a future version of the product. If the test feature is modified on the distributed product, then modifying the test feature may be performed by accessing the test interface of members of the test cell(s), sending a patch to members of the test cell(s) with the test feature, etc.

Alternatively, after the test feature is modified, the test feature may be set as a standard feature without retesting the modified test feature. For example, if the modifications are slight, then the modified test feature may be identified as a standard feature in the product.

Regardless of whether modifications are performed or the test feature is removed, in market research provides a mechanism to obtain realistic feedback about one or more test features. For the following example, consider the scenario in which a standard feature for submitting data from a W-2 form to an accounting application exist and two new test features are created. The standard feature has a user enter the tax data into a computer form. The first test feature has the user enter the tax data in a questionnaire that has individual screens for the form. The second test feature requires that the user use a scanner to generate a computer image of the test feature to be interpreted by the accounting application. Further, a menu may be created that allows the use to choose whether to use the standard feature, the first test feature, or the second test feature.

Continuing with the example, market researchers may define one or more policies. The policies may specify that the size of the non-test group is a quarter of the number of copies of the distributed product and that the remaining copies are partitioned into three test groups. The standard feature and the first test feature are enabled in the first test group. The standard feature and the second test feature are enabled in the second test group. Both the standard feature and the test features are enabled in the third test group.

When the accounting application is sold, in the example, the accounting application may include the previously existing feature enabled and both test features disabled. As copies of the accounting application are installed or activated, members of the test groups and non-test group are identified. Based on the value of the selection key and the above policy(s), test feature sets that include the first test feature, the second test feature, or both test features may be enabled.

Users using the "test" version of the accounting application may not be aware that the feature is in the process of testing. Accordingly, the users may realistically interact with the accounting application and the test features. Further, during the market research, usage data in the form of comments from the users, amount of time spent submitting the data from the W-2 form, which feature was used more often, availability of a scanner, etc. may be obtained.

In the example, the company generating the accounting application may learn that users choose to use the test feature corresponding to the questionnaire. The users may be those users who had the option of the test feature corresponding to the questionnaire. Further, the usage data may also include comments from users, such as those that choose to use the test feature corresponding to the scanner felt that submitting the tax data was too arduous for such a small amount of data.

In the example, by comparing the usage data between the test groups and the non-test group may determine that future release of the accounting application should only include the test feature corresponding to the questionnaire. Further, the company may redesign portions of the test feature corresponding to the questionnaire according to feedback from the users. Because the test feature corresponding to the questionnaire has been tested in the market place, the company may have an understanding of how the test feature will perform in the market.

Figure 5:
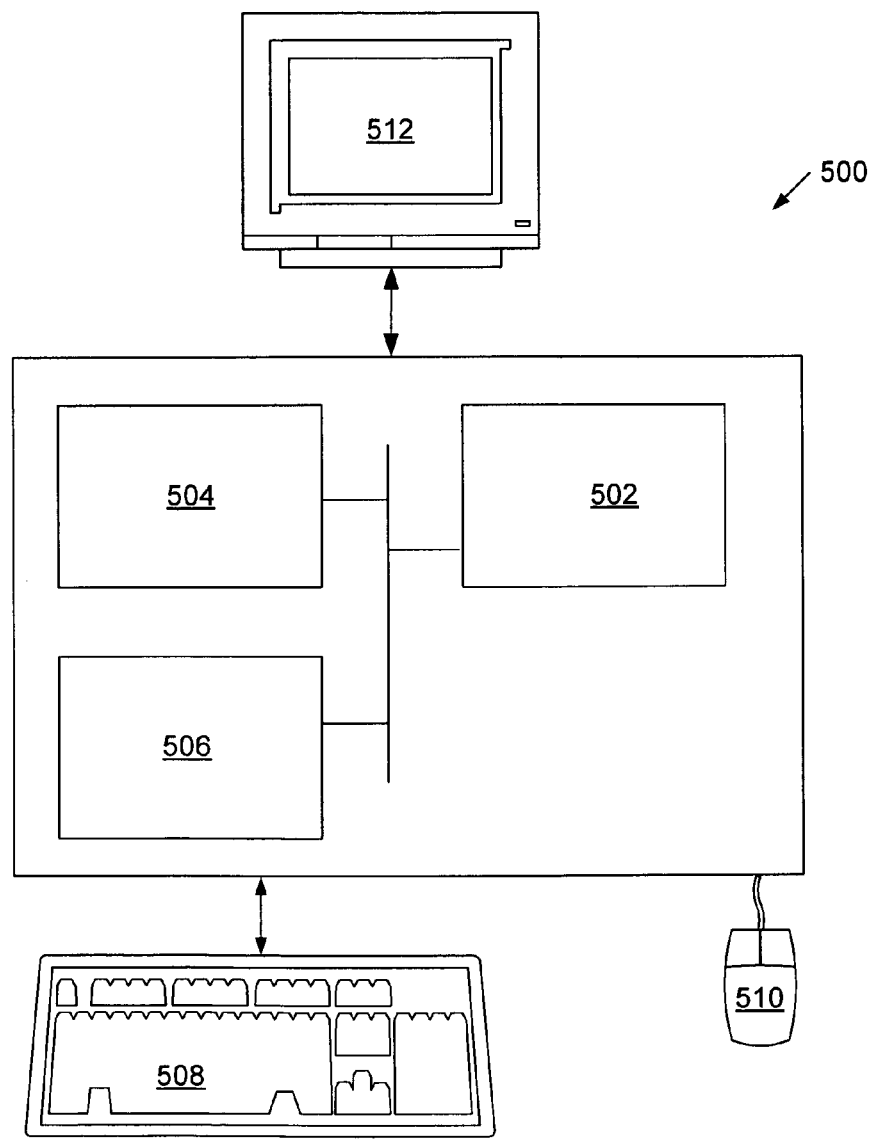
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., market research engine, group assignment engine, testing data repository, policy, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of gathering research associated with a product comprising:
   distributing the product to a group of users in a market resulting in a distributed product,
      wherein the distributed product comprises a first standard feature and a first test feature, and
      wherein each copy of the distributed product has a corresponding license number;
   hashing the license number of each copy of the distributed product to generate a plurality of selection keys;
   selecting, by one or more processors of a computer system, a subset of selection keys from the plurality of selection keys based on a policy defining a size of a first test group;
   identifying the first test group from the group of users based on the subset of selection keys;
   enabling, by the one or more processors, the first test feature only in the first test group remotely via a network;
   gathering, by the one or more processors, first usage data associated with the enabled first test feature from the first test group; and
   evaluating, by the one or more processors, the enabled first test feature based on the first usage data to obtain a test result.

2. The method of claim 1, further comprising:
   defining the first test feature as a second standard feature based on the test result.

3. The method of claim 2, wherein a market researcher identifies the first test feature as the second standard feature.

4. The method of claim 1, further comprising:
   modifying the enabled first test feature in the first test group.

5. The method of claim 4, wherein a developer modifies the enabled first test feature.

6. The method of claim 1, further comprising:
   disabling the enabled first test feature on a member of the first test group.

7. The method of claim 1, wherein the group of users further comprises a non-test group, wherein the non-test group is disjoint from the first test group.

8. The method of claim 7, further comprising:
   gathering second usage data associated with using the distributed product from the non-test group.

9. The method of claim 1, wherein each of the plurality of selection keys is an integer between zero and ninety-nine.

10. The method of claim 1, wherein the policy further specifies a second test feature to enable in the first test group.

11. The method of claim 1, wherein the group of users further comprises a second test group, wherein the first test feature and a second test feature are enabled in the second test group.

12. The method of claim 1, wherein the distributed product is a software application.

13. A system for gathering research associated with a product comprising:
   a computer readable storage device having the product stored thereon, the product comprising a first standard feature and a first test feature; and
   a computer system executing a market research framework configured to:
      distribute the product to a group of users in a market resulting in a distributed product, wherein each copy of the distributed product has a corresponding license number;
      hash the license number of each copy of the distributed product to generate a plurality of selection keys;
      select a subset of selection keys from the plurality of selection keys based on a policy defining a size of a first test group;
      identify the first test group in the group of users based the subset of selection keys;
      enable the first test feature only in the first test group remotely via a network;
      gather first usage data associated with the enabled first test feature from the first test group; and
      evaluate the enabled first test feature based on the first usage data to obtain a test result.

14. The system of claim 13, wherein the market research framework is further configured to:
   define the first test feature as a second standard feature based on the test result.

15. The system of claim 13, wherein the market research framework is further configured to:
   modify the first test feature enabled in the first test group.

16. The system of claim 13, further comprising:
a test interface configured to disable the enabled first test feature.

17. The system of claim 13, wherein the group of users further comprises a non-test group, wherein the non-test group is disjoint from the first test group.

18. The system of claim 17, wherein the market research framework is further configured to:
gather second usage data associated with the distributed product from the non-test group.

19. The system of claim 13, wherein each of the plurality of selection keys is an integer between zero and ninety-nine.

20. The system of claim 13, wherein the policy further specifies a second test feature to enable in the first test group.

21. The system of claim 13, wherein the group of users further comprises a second test group, wherein the first test feature and a second test feature are enabled in the second test group.

22. The system of claim 13, wherein the distributed product is a software application.

23. A non-transitory computer usable medium comprising computer readable program code embodied therein for causing a computer system to:
monitor distribution of the product to a group of users in a market resulting in a distributed product, wherein the distributed product comprises a first standard feature and a first test feature, and wherein each copy of the distributed product has a corresponding license number;
hash the license number of each copy of the distributed product to generate a plurality of selection keys;
select a subset of selection keys from the plurality of selection keys based on a policy defining a size of a test group;
identify the test group in the group of users based the subset of selection keys;
enable, via a network, the first test feature only in the test group;
gather usage data associated with the enabled first test feature from the test group; and
evaluate the enabled first test feature based on the usage data to obtain a test result.

24. The non-transitory computer usable medium of claim 23, wherein the computer readable program code embodied therein for further causing the computer system to identify the first test feature as a second standard feature based on the test result.

25. The non-transitory computer usable medium of claim 23, wherein the computer readable program code embodied therein for further causing the computer system to modify the enabled first test feature in the test group.

26. The non-transitory computer usable medium of claim 23, wherein the computer readable program code embodied therein for further causing the computer system to disable the enabled first test feature on a member of the test group.

* * * * *